(12) United States Patent
Pak et al.

(10) Patent No.: US 12,482,895 B2
(45) Date of Patent: Nov. 25, 2025

(54) BATTERY PACK

(71) Applicant: SK ON CO., LTD., Seoul (KR)

(72) Inventors: Byeong Jun Pak, Daejeon (KR); Min Song Kang, Daejeon (KR); Ha Chul Jeong, Daejeon (KR); Jeong Woon Ko, Daejeon (KR); Bon Seok Ku, Daejeon (KR); Ja Sung Yun, Daejeon (KR); Jeong Joo Lee, Daejeon (KR); Jun Hee Jung, Daejeon (KR); Sei Hoon Cho, Daejeon (KR); Ha Neul Choi, Daejeon (KR); Jin Su Han, Daejeon (KR); Jae Il Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 597 days.

(21) Appl. No.: 17/930,698

(22) Filed: Sep. 8, 2022

(65) Prior Publication Data

US 2023/0069871 A1    Mar. 9, 2023

(30) Foreign Application Priority Data

Sep. 9, 2021   (KR) .................. 10-2021-0120401

(51) Int. Cl.
*H01M 50/383*      (2021.01)
*H01M 50/211*      (2021.01)
(Continued)

(52) U.S. Cl.
CPC ....... *H01M 50/383* (2021.01); *H01M 50/211* (2021.01); *H01M 50/271* (2021.01);
(Continued)

(58) Field of Classification Search
CPC ............ H01M 50/383; H01M 50/289; H01M 50/211; H01M 50/507; H01M 50/271; H01M 2200/00
See application file for complete search history.

(56) References Cited

U.S. PATENT DOCUMENTS

2012/0015218 A1*   1/2012  Lee ................... H01M 50/30
                                               429/53
2018/0102576 A1*   4/2018  Yamamoto ........ H01M 10/6556
(Continued)

FOREIGN PATENT DOCUMENTS

CN      102110795 A    6/2011
EP       2403031 A1    1/2012
(Continued)

OTHER PUBLICATIONS

Extended European Search Report for European Patent Application No. 22192712.2, mailed Feb. 8, 2023 (9 pages).

*Primary Examiner* — Alexander Usyatinsky
(74) *Attorney, Agent, or Firm* — Perkins Coie LLP

(57) ABSTRACT

A battery pack includes a pack housing including a plurality of accommodation spaces; a partition member coupled to the pack housing and partitioning a space of the pack housing into the plurality of accommodation spaces; a plurality of pack units respectively disposed in the plurality of accommodation spaces; a first pack cover in contact with the partition member and covering at least one of the plurality of accommodation spaces or the pack unit; and a second pack cover covering the first pack cover and the pack housing.

9 Claims, 8 Drawing Sheets

(51) Int. Cl.
*H01M 50/271* (2021.01)
*H01M 50/289* (2021.01)
*H01M 50/507* (2021.01)

(52) U.S. Cl.
CPC ....... *H01M 50/289* (2021.01); *H01M 50/507* (2021.01); *H01M 2200/00* (2013.01)

(56) References Cited

U.S. PATENT DOCUMENTS

| | | | |
|---|---|---|---|
| 2020/0099114 A1* | 3/2020 | Ryu | H01M 10/615 |
| 2020/0152942 A1* | 5/2020 | Page | H01M 50/213 |
| 2021/0184303 A1* | 6/2021 | Lee | H01M 10/647 |
| 2022/0115737 A1 | 4/2022 | Shin et al. | |

FOREIGN PATENT DOCUMENTS

| | | |
|---|---|---|
| EP | 3828988 A1 | 6/2021 |
| EP | 4084201 A1 | 11/2022 |
| KR | 10-2009-0043717 A | 5/2009 |
| KR | 10-2019-0094921 A | 8/2019 |
| KR | 10-2020-0107213 A | 9/2020 |
| KR | 10-2021-0004189 A | 1/2021 |
| KR | 10-2021-0077415 A | 6/2021 |

\* cited by examiner

BATTERY PACK

CROSS-REFERENCE TO RELATED APPLICATION(S)

This application claims benefit of priority to Korean Patent Application No. 10-2021-0120401 filed in the Korean Intellectual Property Office on Sep. 9, 2021, the disclosure of which is incorporated herein by reference in its entirety.

TECHNICAL FIELD

The present disclosure relates to a battery pack.

BACKGROUND

A secondary battery is a battery capable of charging and discharging, and has a wide application range including relatively small portable electronic devices, mid-sized to large-sized automobiles, and power storage devices.

The secondary battery may be used as a secondary battery cell, and the secondary battery cell may have a configuration in which a stack body including a positive electrode, a negative electrode, and a separator is disposed and an electrolyte is filled in an exterior material.

When a battery pack includes a plurality of secondary battery cells electrically connected to each other, its power capacity and power output may increase.

When the plurality of secondary battery cells in the battery pack are overcharged, exposed to heat or external shocks, the battery pack may have a risk of ignition or explosion.

SUMMARY

The present disclosure includes features in battery pack designs for various battery applications.

When ignition or explosion occurs in at least one of the secondary battery cells that constitute the battery pack, gas, flame, heat, and/or a conductive material may propagate to adjacent secondary battery cells. The disclosed technology can be implemented in some embodiments to prevent ignition or explosion of a battery pack by reducing or minimizing propagation of gas, flame, heat, and/or a conductive material from one secondary battery cell in which the ignition or explosion is first started to the other secondary battery cells.

In some implementations, the disclosed technology of the present disclosure can be used to improve airtightness and safety of a battery pack.

In some implementations, the disclosed technology of the present disclosure can be used to delay or minimize heat propagation in a battery pack.

According to an aspect of the present disclosure, a battery pack can include a pack housing having a plurality of accommodation spaces; a partition member coupled to the pack housing and partitioning the plurality of accommodation spaces; a pack unit respectively disposed in the plurality of accommodation spaces; a first pack cover contacting the partition member and covering the plurality of accommodation spaces or the pack unit; and a second pack cover covering the first pack cover and the pack housing.

In an embodiment, the pack unit may include a plurality of battery cells, wherein at least one or more heat propagation blocking member are configured between the plurality of battery cells.

Also, in an embodiment, the first pack cover may be in contact with the heat propagation blocking member to isolate the plurality of battery cells from each other in the pack unit.

Also, in an embodiment, a region of the first pack cover facing the battery cell may be planar.

Also, in an embodiment, a region of the first pack cover contacting the heat propagation blocking member may protrude toward the heat propagation blocking member.

Also, in an embodiment, at least a portion of a region of the first pack cover, facing the battery cell, may be in contact with the battery cell.

Also, in an embodiment, at least a portion of the battery pack that includes a plurality of battery cells, wherein at least one or more heat propagation blocking member are configured between the plurality of battery cells, wherein at least a portion of an inner surface of the first pack cover, facing the battery cell, is spaced apart from the battery cell to form a venting path between the at least portion of the inner surface of the first pack cover and the battery cell.

In addition, in an embodiment, the heat propagation blocking member may pass through the first pack cover.

Also, in an embodiment, the battery pack may further include a bus bar assembly to which electrode tab of the battery cell is connected.

In one embodiment, the bus bar assembly may include: a bus bar member to which the electrode tab of the battery cell is connected; and an insulating member supporting the bus bar member.

Also, in an embodiment, the battery pack may further include end plates located on front and rear surfaces of the pack unit and facing the battery cell.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
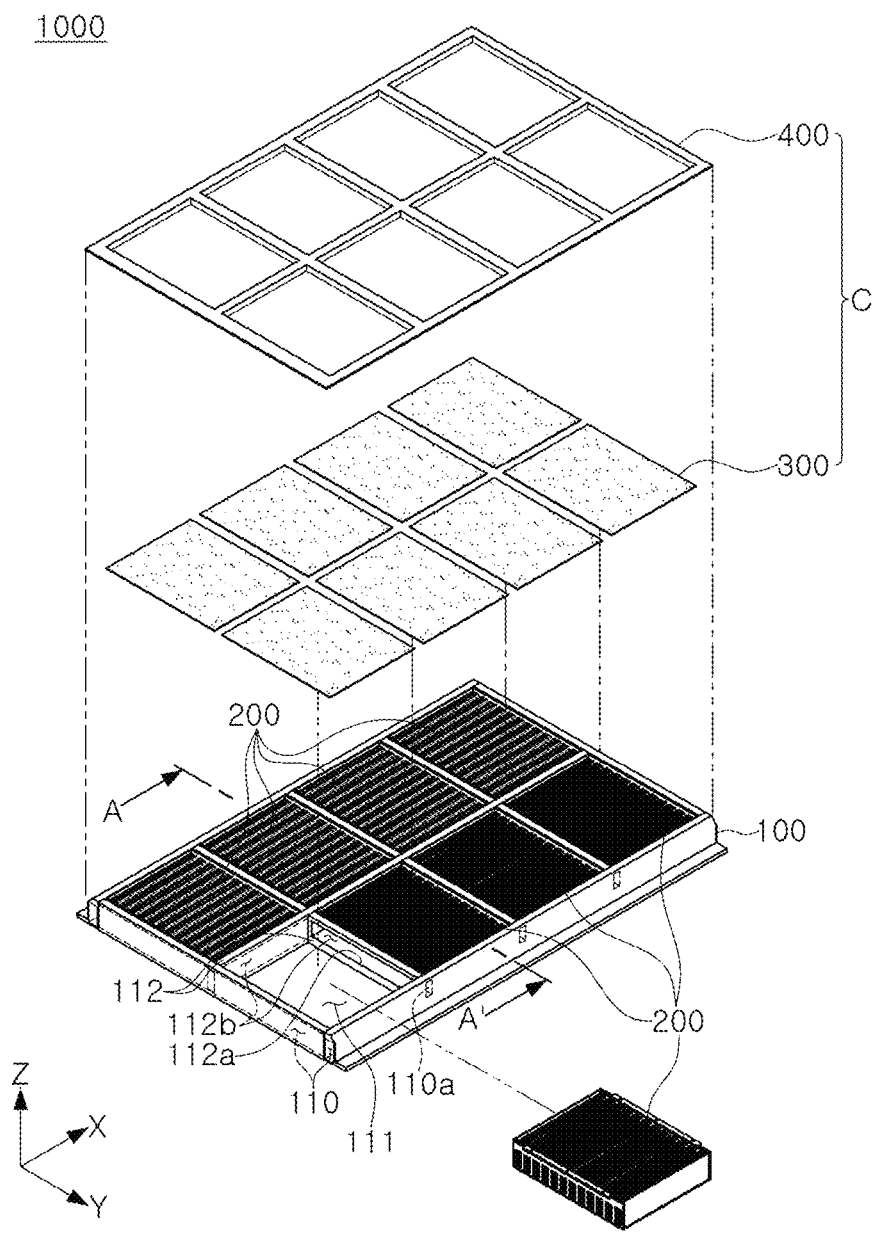
FIG. 1 is an exploded perspective view of a battery pack according to an embodiment of the present disclosure.

In order to help understanding of a description of embodiments of the present disclosure, elements indicated with the same reference numerals in the accompanying drawings are the same elements, and related elements among the elements that perform the same action in each embodiment are marked with the same numeral or related numerals. In addition, a description of certain elements and techniques well known in the prior art may be omitted in the present disclosure.

As illustrated in the accompanying drawings, an X axis is a direction, parallel to a direction perpendicular to a stacking direction of battery cells, a Y axis is a direction, parallel to the stacking direction of the battery cells, and a Z axis is a direction, parallel to a height direction of the battery cells.

FIG. 1 is an exploded perspective view of a battery pack according to an embodiment of the present disclosure.

As illustrated in FIG. 1, a battery pack 1000 according to an embodiment of the present disclosure may include a pack housing 100 having an accommodation space 111, at least one pack unit 200 accommodated in the pack housing 100, and a pack cover C covering the unit body 200 or the accommodation space 111 in which the pack unit 200 is present.

The pack housing 100 includes sidewalls or frames that collectively define or provide an accommodation space (e.g., 111) within the pack housing 100. The pack housing 100 may include at least one partition member 112, and the partition member 112 may partition a space of the pack housing 100 into different regions, for example, a plurality of accommodation spaces 111 as shown in FIG. 1. The partition member 112 may be provided as a single member, or a plurality of partition members 112 may be coupled to the pack housing 100. The at least one pack unit 200 may be provided in the accommodation spaces 111 partitioned by the partition member 112. In the example shown in FIG. 1, partition members 112 are placed at different locations and are engaged to the sidewalls or frames of the pack housing 100 in a way to partition a space within the pack housing 100 into 8 different generally rectangular regions (e.g., accommodation spaces 111) and each region is to receive and accommodate one pack unit 200.

In an embodiment of the present disclosure, the pack unit 200 may be provided as a plurality of pack units 200. In addition, the partition member 112 may partition the space within the pack housing 100 into the accommodation spaces 111 such that the number of the accommodation spaces 111 corresponds to the plurality of pack units 200.

Each of the plurality of pack units 200 may be accommodated in each accommodation space 111 partitioned by the partition member 112.

The number of the accommodating spaces 111, the number of partition members 112, and the number of pack units 200 existing in the accommodating space 111 are not limited by the present disclosure, and may be appropriately selected and applied according to a specification of the battery pack 1000 to be required, or the like.

The pack cover C may be coupled to at least one of the pack housing 100 and the partition member 112 to cover the accommodation space 111 or the pack unit 200.

At least a portion of a region in which the pack cover C faces the accommodation space 111 or the pack unit 200 may protrude toward the accommodation space 111 or the pack unit 200. The protruding region of the pack cover C may be in contact with at least one of the pack housing 100 and the partition member 112 to separate spaces, each in which the plurality of pack units 200 are present, for example, spaces partitioned by the partition member 112, from each other.

The movement of a material between the pack units 200 separated from each other by the partition member 112 may be blocked by, for example, the accommodation spaces 111 and/or pack covers as will be discussed blow, and the material may refer collectively to a material generated when a thermal runaway phenomenon, ignition, explosion, or the like occurs in a pack unit 200 among the plurality of pack units 200, and a by-product formed by the thermal runaway phenomenon, the ignition, and the explosion, or the like.

In addition, the partition member 112 may be provided as a hollow form, to contribute to reducing overall weight of the battery pack 1000.

In an embodiment of the present disclosure, the pack cover C may include a first pack cover 300 and a second pack cover 400. The second pack cover 400 may be present on top of the first pack cover 300 in a +Z direction, and may be in contact with the first pack cover 300. In addition, the second pack cover 400 may cover at least one of the first pack cover 300, the accommodation space 111, and the pack unit 200.

The second pack cover 400 may be coupled to at least one of the pack housing 100, the partition member 112, or the first pack cover 300 by bolting, welding, bonding, or the like, but a method thereof is not necessarily limited by the present disclosure.

The second pack cover 400 may press the first pack cover 300 in a −Z direction, and may compact the first pack cover 300 in a direction in which the pack unit 200 exists, to contribute to increasing airtightness of a space in which one pack unit 200 is disposed.

In addition, since the second pack cover 400 may press the first pack cover 300, a separate component for fastening the first pack cover 300 to the pack housing 100 may not be required. This may contribute to simplifying a structure of the battery pack 1000.

A first pack cover 300 according to an embodiment of the present disclosure may cover the pack unit 200 or the accommodation space 111 from the bottom of the second pack cover 400 in the −Z direction.

The first pack cover 300 may be provided as a plurality of first pack covers 300, and the number of first pack covers 300 corresponding to the number of the pack units 200 may be provided. The first pack cover 300 and the pack unit 200 may correspond in a one-to-one relationship, and each of the plurality of pack units 200 may be covered by each of the plurality of first pack covers 300.

The first pack cover 300 may be present on the top of the plurality of pack units 200 in the +Z direction, and may cover an upper portion of each of the pack units 200, to isolate or seal a space allocated to one pack unit 200.

Therefore, airtightness of the accommodation space 111 in which one pack unit 200 is present may be improved. In addition, when a thermal runaway phenomenon, ignition, explosion, or the like occurs in the one pack unit 200, transferring of the thermal runaway phenomenon, the ignition, the explosion, or the like to the other pack unit 200, or propagation of a material generated by these may be delayed, minimized, or prevented.

The material generated by the thermal runaway phenomenon, the ignition, the explosion, or the like may be, for example, at least one of flame, gas, or a particle. The gas may be at least any one or more of a gas generated by an electrolyte, or a combustion gas, and the particle may be at least one of combustion material particles, or a particle of an element constituting the battery pack 1000.

When the material generated by the thermal runaway phenomenon, the ignition, the explosion, or the like is gas, because the gas may be highly likely to propagate through a path existing the top of the pack unit 200 in the +Z direction due to nature of the gas, by the second pack cover 400 may be disposed on the top of the pack unit 200 to delay, minimize, or prevent propagation of the gas from the pack unit 200, in which the gas is initially generated, to the other pack unit 200.

In an embodiment of the present disclosure, the partition member 112 may include a first venting hole 112a, which may be a through-hole in a region facing the pack unit 200, and may include a first hollow portion 112b, which may be a hollow portion therein. At least one of gas or combustion gas by the electrolyte, generated in the pack unit 200 may be introduced into the first venting hole 112a.

The first hollow portion 112b may be present in the partition member 112 in at least one direction of a direction parallel to the X-axis, or a direction parallel to the Y-axis. In an embodiment of the present disclosure, the first hollow portion 112b existing in a direction parallel to the Y-axis may be connected to the first venting hole 112a and a second hollow portion 110 formed in the pack housing 100.

The second hollow portion 110 may be present in the pack housing 100 in at least one direction of a direction parallel to the X-axis, or a direction parallel to the Y-axis. The second hollow portion 110 existing in a direction parallel to the X-axis may be connected to the first hollow portion 112b existing in a direction parallel to the Y-axis of the partition member 112, as described above. The second hollow portion 110 existing in a direction parallel to the Y-axis may be connected to the first hollow portion 112b of the partition member 112 existing in a direction parallel to the X-axis.

The first hollow portion 112b and the second hollow portion 110 may be continuously present to have a predetermined section in the pack housing 100, and the second hollow portion 110 may be provided in communication with an outside of the pack housing 100. In addition, the pack housing 100 may include a second venting hole 110a in a region facing the partition member 112. The second venting hole 110a may serve to connect the second hollow portion 110 existing in a direction parallel to the X-axis of the pack housing 100 and the first hollow portion 112b existing in a direction parallel to the Y-axis of the partition member 112, and may serve to connect the second hollow portion 110 existing in a direction parallel to the Y axis of the pack housing 100 and the first hollow portion 112b existing in a direction parallel to the X axis of the partition member 112.

Therefore, at least one of gas or combustion gas generated by the electrolyte generated in the pack unit 200 may flow into the first venting hole 112a and may pass through the first hollow portion 112b and the second hollow portion 110, to be discharged to the outside of the pack housing 100. The first hollow portion 112b and the second hollow portion 110 not only create an effect of forming an exhaust path of at least one of gas or combustion gas by the electrolyte generated in the pack unit 200, but also contribute to reducing a weight of the battery pack 1000.

Figure 2:
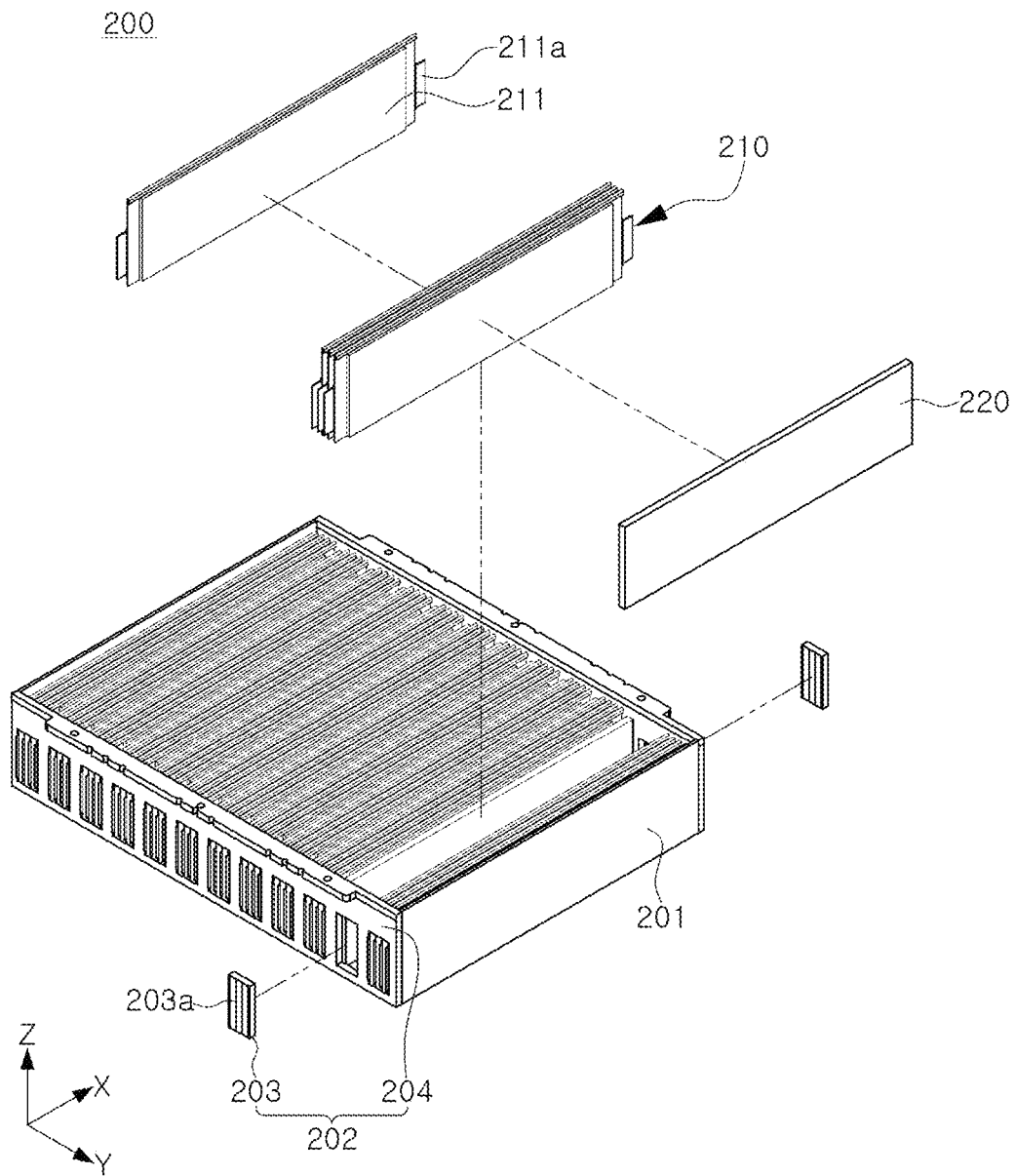
FIG. 2 is a partially exploded perspective view of a pack unit according to an embodiment of the present disclosure.

FIG. 2 is a partially exploded perspective view of a pack unit 200 according to an embodiment of the present disclosure.

As illustrated in FIG. 2, the pack unit 200 may include a plurality of cell groups 210 formed by including a plurality of battery cells 211, and at least one heat propagation blocking member 220 disposed between the battery cells 211 or the cell groups 210.

The battery cells 211 may be stacked in a +Y direction or a −Y direction to form one cell group 210.

The number of battery cells 211 stacked to form the one cell group 210 is not necessarily limited by the present disclosure, and may be appropriately selected and applied according to a specification of a battery pack to be required.

The cell group 210 may be stacked in the +Y direction or the −Y direction. At least one of a buffer pad (not illustrated) disposed between the battery cells 211 to correspond to expansion of the battery cells 211, or a cooling pad (not illustrated) disposed between the battery cells 211 to cool the battery cells 211, may be disposed in the cell group 210, but this is not necessarily limited by the present disclosure.

The heat propagation blocking member 220 may be disposed between the plurality of battery cells 211 constituting the cell group 210 or between the plurality of cell groups 210, or both thereof. The plurality of cell groups 210 with the heat propagation blocking member 220 interposed therebetween may be isolated from each other.

The heat propagation blocking member 220 may serve to delay, minimize, or prevent propagation of a thermal runaway phenomenon, ignition, explosion, or the like occurring in one cell group 210 to an adjacent cell group 210, and may serve to delay, minimize, or prevent propagation of damage due to the thermal runaway phenomenon, the ignition, the explosion, or the like to a cell group 210 in which no thermal runaway phenomenon, ignition, explosion, or the like has occurred.

The plurality of cell groups 210 and the plurality of heat propagation blocking member 220, stacked in +Y direction or the −Y direction, may be supported by at least one of an end plate 201 or a bus bar assembly 202.

The bus bar assembly 202 may include a bus bar member 203 electrically connected to an electrode tab 211a of the battery cell 211, and an insulating member 204 supporting the bus bar member 203. The bus bar member 203 may include a slot 203a to which the electrode tab 211a is connected. The slot 203a may be a passage through which at least one of gas or combustion gas by an electrolyte generated in the battery cell 211 is discharged. In an embodiment of the present disclosure, at least any one of gas and combustion gas by the electrolyte leaked into the slot 203a may be introduced into a venting hole (112a in FIG. 1) provided in a partition member (112 in FIG. 1).

The battery cells 211, located on a front surface and a rear surface of the pack unit 200, may face the end plate 201, and the end plate 201 may be disposed in a region in which the bus bar assembly 202 does not exist. In an embodiment of the present disclosure, the end plate 201 may be coupled to the bus bar assembly 202, but this is also not necessarily limited by the present disclosure, which may be appropriately selected and applied according to a specification of a battery pack to be required.

In this manner, when the pack unit 200 is configured by at least one of the bus bar assembly 202 or the end plate 201, the pack unit 200 may be completed without using a separate member. Therefore, there may be an advantage of reducing light an overall weight of a battery pack.

In an embodiment of the present disclosure, the end plate 201 and the bus bar assembly 202 may support the pack unit 200 to expose upper and lower portions of the pack unit 200 in the Z-axis direction.

The pack unit 200 of which lower portion is exposed by at least one of the end plate 201 or the bus bar assembly 202 may be directly seated on a bottom surface of a pack housing (100 in FIG. 1). When a pack unit 200 is supported by at least any one of the end plate 201 or the bus bar assembly 202, a plurality of battery cells 211 may be formed as the pack unit 200, even without a case (not illustrated) covering a bottom of the pack unit 200. In addition, since the pack unit 200 formed in this manner may be directly seated on the bottom surface of the pack housing (100 in FIG. 1), a weight of a battery pack may be reduced, or a size of the battery cells 211 may be increased to increase capacity of the battery pack.

A resin (not illustrated) or the like may be applied between the bottom of the pack unit 200 and the pack housing (100 in FIG. 1), but this is not necessarily limited by the present disclosure.

Figure 3:
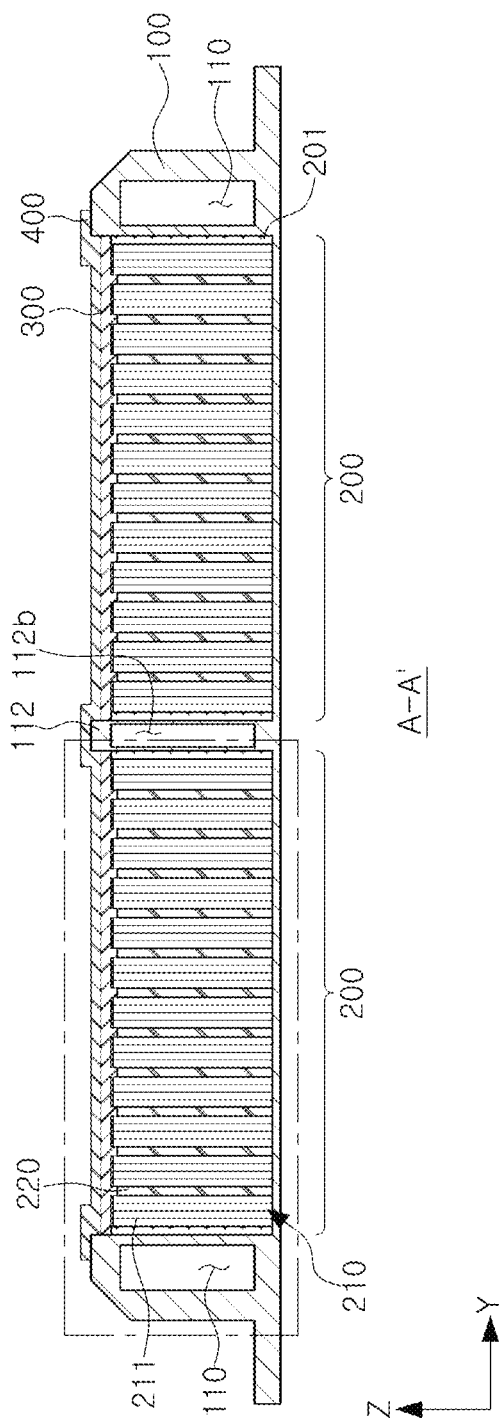
FIG. 3 is a cross-sectional view of FIG. 1, taken along line A-A'.

FIG. 3 is a cross-sectional view of FIG. 1, taken along line A-A'. To increase visibility of the drawing, a cross-sectional view of the battery cell 211 is not illustrated in FIG. 3.

As illustrated in FIG. 3, in an embodiment of the present disclosure, the partition member 112 may be provided integrally in the pack housing 100, and may protrude from the pack housing 100 to be disposed between the pack units 200. An uppermost portion of the partition member 112 in the +Z direction may be present on a higher level, as compared to an uppermost portion of a battery cell 211, an uppermost portion of a heat propagation blocking member 220, and an uppermost portion of the first pack cover 300 in the +Z direction.

According to this, it is possible to easily isolate or seal each of the pack units 200 in the pack housing 100 only by designing a height of the pack housing 100, a height of the partition member 112, and a height of the pack unit 200, without a separate configuration.

One pack unit 200 according to an embodiment of the present disclosure may be formed by stacking a plurality of cell groups 210 in the +Y direction or the −Y direction, and disposing the heat propagation blocking member 220 between the cell groups 210.

An upper portion of the one pack unit 200 in the +Z direction may be primarily covered by the first pack cover 300, and may be secondarily covered by the second pack cover 400 present on the top of the first pack cover 300 in the +Z direction.

The second pack cover 400 may cover at least a portion of the plurality of pack units 200, at least a portion of the accommodation space (111 in FIG. 1), at least a portion of the partition member 112, and at least a portion of the pack housing 100. An inner surface of the second pack cover 400 facing the pack unit 200 may be in contact with the pack housing 100, the first pack cover 300, and the partition member 112, and the second pack cover 400 may press the first pack cover 300 by a weight of the second pack cover 400.

Figure 4:
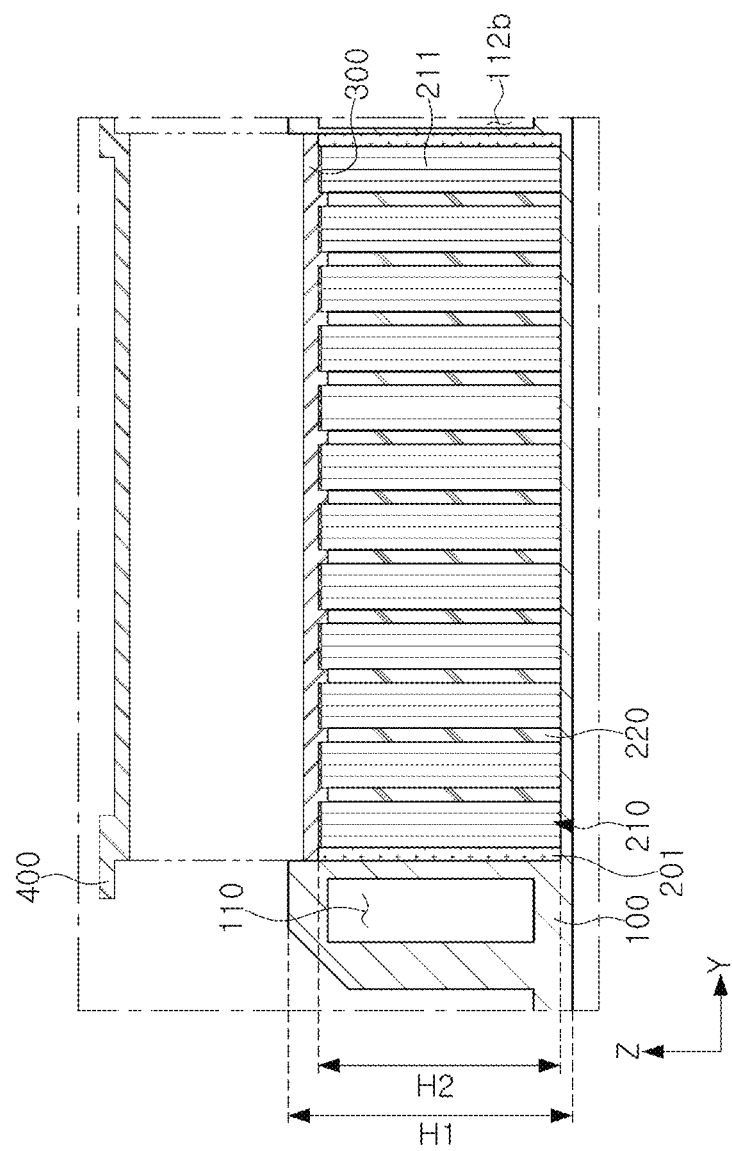
FIG. 4 is a view in which a portion of FIG. 3 is enlarged and disassembled.

FIG. 4 is a view in which a portion of FIG. 3 is enlarged and disassembled.

As illustrated in FIG. 4, in an embodiment of the present disclosure, a height H1 of the pack housing 100 may be longer than a height H2 of the battery cell 211, in a height direction.

In this case, the height direction may be a direction, intersecting a direction in which the battery cells 211 are stacked.

In addition, a level of an uppermost portion of the pack housing 100 in the +Z direction may be higher than a level of an uppermost portion of the battery cell 211 in the +Z direction. Therefore, the uppermost portion of the pack housing 100 in the +Z direction may be present on a higher level than the uppermost portion of the battery cell 211 in the +Z direction.

Therefore, the pack unit 200 may be easily accommodated in the pack housing 100, and a space in which one pack unit 200 is present may be easily isolated from other spaces in the pack housing 100.

Figure 5:
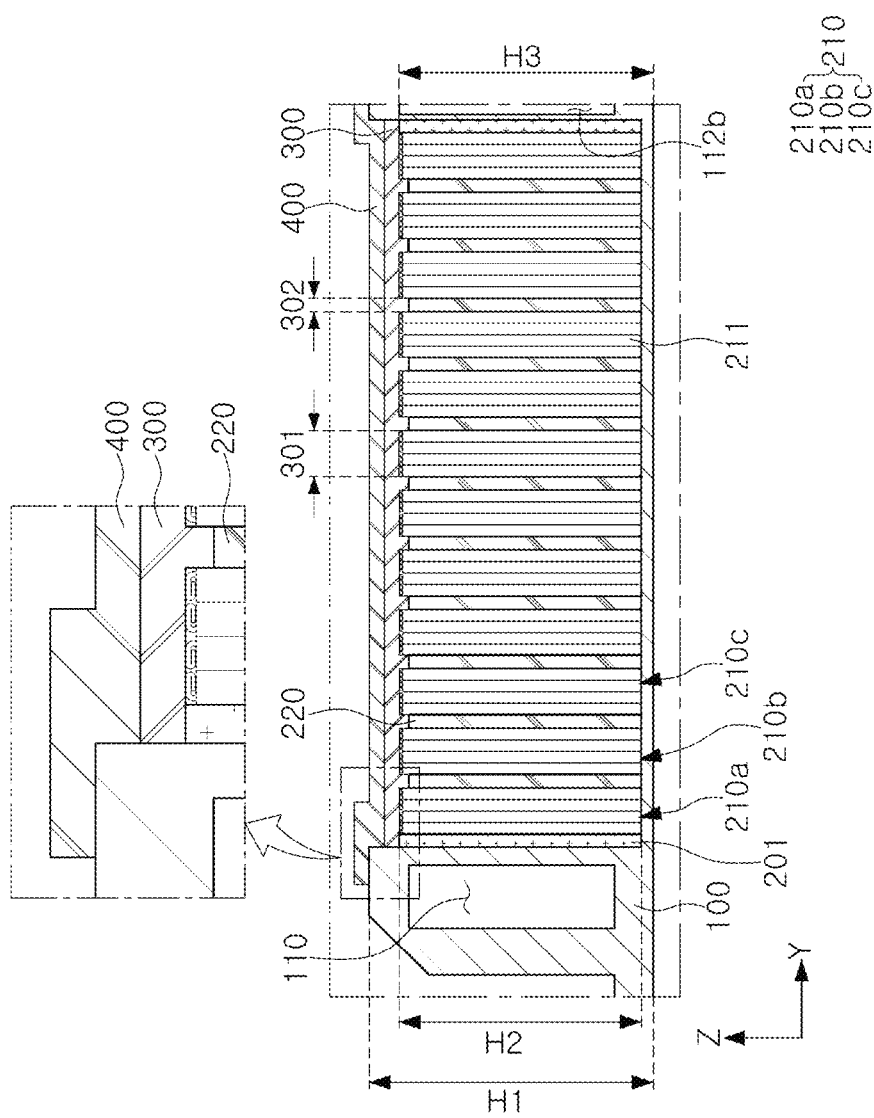
FIG. 5 is a partially enlarged view of FIG. 3.

FIG. 5 is a partially enlarged view of FIG. 3.

As illustrated in FIG. 5, one heat propagation blocking member 220 may be disposed between a cell group 210a existing in an outermost portion of the pack unit 200 and contacting the end plate 201, and a cell group 210b adjacent to the cell group 210a.

In addition, the other heat propagation blocking member 220 may be disposed between the cell group 210b and a cell group 210c adjacent to the cell group 210b. In an embodiment of the present disclosure, a heat propagation blocking member 220 may be disposed for a cell group 210 in a pack unit 200, in the same manner as described above, and the heat propagation blocking member 220 may be in contact with the cell group 210, respectively, to isolate the cell groups 210 from each other in the pack unit 200.

In an embodiment of the present disclosure, a surface of the first pack cover 300 facing the battery cell 211 may be in contact with the battery cell 211, and a surface of the first pack cover 300 facing the heat propagation blocking member 220 may be in contact with the heat propagation blocking member 220. In this case, a height level of the heat propagation blocking member 220 may be lower than a height level of the battery cell 211.

A surface of the first pack cover 300 facing the battery cell 211 may be provided as a planar surface in the Y-axis direction, and the planar surface may be a planar portion 301. A surface of the first pack cover 300 facing the heat propagation blocking member 220 may be connected to the planar portion 301 and may protrude in a direction facing the heat propagation blocking member 220, to become a protruding portion 302.

In this case, a cross-sectional shape of the first pack cover 300 may be such that the planar portion 301 and the protruding portion 302 are alternately arranged in the Y-axis direction, and the planar portion 301 and the protruding portion 302 may form a concave-convex portion in the cross-sectional shape of the first pack cover 300.

A height H3 of the planar portion 301, the surface of the first pack cover 300 facing the battery cell 211, may be, at least, equal to the height H2 of the battery cell 211.

Therefore, it is possible to increase airtightness of a space in which one cell group 210 is disposed, to prevent a space in which each of the cell groups 210 is present from communicating with each other, and to isolate the cell groups 210 from each other.

In this case, gas generated from the pack unit 200 may be guided to a separate external venting path (not illustrated) provided in the pack housing 100, to be discharged to an outside of the pack housing 100, or may be discharged through a slot (203a in FIG. 2) formed in the bus bar member (203 in FIG. 1) to pass through a first venting hole (112a in FIG. 1), a first hollow portion (112b in FIG. 1), a second venting hole (110a in FIG. 1), and a second hollow portion (110 in FIG. 1), to be discharged to the outside of the pack housing 100. Since explanations related to venting do not fall within the main characteristics of the present disclosure, a detailed description thereof will be omitted.

Figure 6:
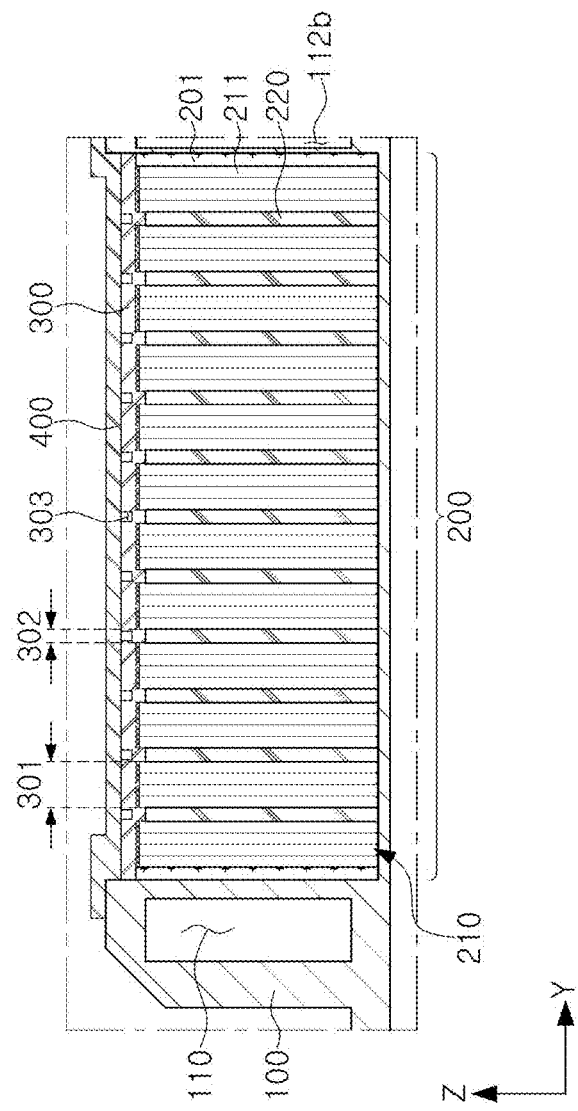
FIG. 6 is a partially enlarged view of a portion corresponding to FIG. 3, according to another embodiment of the present disclosure.

FIG. 6 is a partially enlarged view of a portion corresponding to FIG. 3, according to another embodiment of the present disclosure.

As illustrated in FIG. 6, a first pack cover 300 may include a concave-convex portion in the cross-sectional shape of a region of the first pack cover 300 facing a pack unit 200. An embodiment illustrated in FIG. 6 may be different from the embodiment illustrated in FIG. 5 in view that the first pack cover 300 has an irregular surface to include a third hollow portion 303.

The third hollow portion 303 may be formed on a surface of the first pack cover 300, opposite to a surface of which the first pack cover 300 faces the pack unit 200. In addition, the third hollow portion 303 may be formed in a region in which the first pack cover 300 protrudes toward the heat propagation blocking member 220.

The third hollow portion 303 may be provided as a plurality of third hollow portions 303 on the first pack cover 300, and the plurality of third hollow portions 303 may be spaced apart from each other on the first pack cover 300 by a predetermined distance in the Y-axis direction. In addition, the third hollow portion 303 may be continuous in the X-axis (X in FIG. 1) direction, and an upper portion of the third hollow portion 303 may be sealed by being covered by a second pack cover 400.

The third hollow portion 303 may be used as a flow path through which a refrigerant flows or as a flow path for venting, but this is not necessarily limited by the present disclosure, and may be appropriately selected and applied according to a specification of a battery pack to be required.

Figure 7:
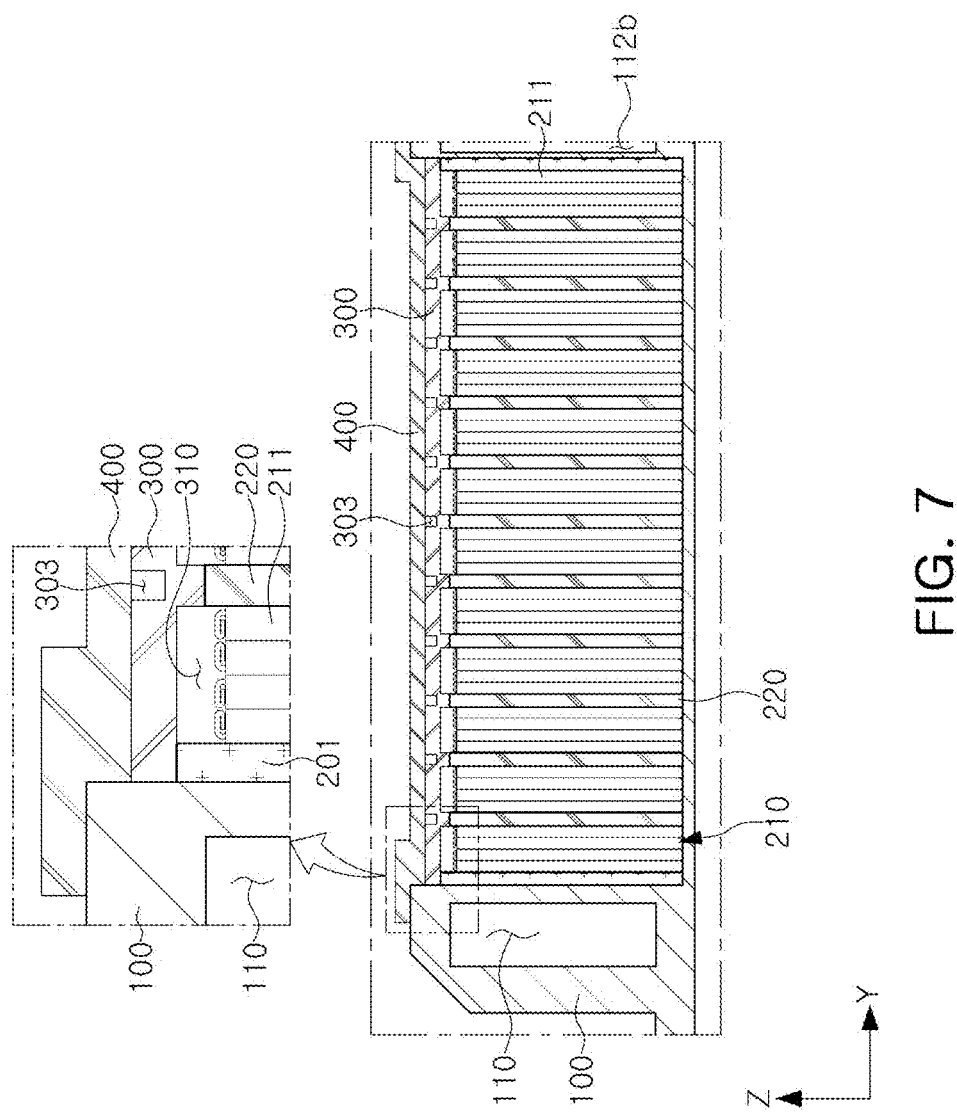
FIG. 7 is a partially enlarged view of a portion corresponding to FIG. 3, according to another embodiment of the present disclosure.

FIG. 7 is a partially enlarged view of a portion corresponding to FIG. 3, according to another embodiment of the present disclosure.

As illustrated in FIG. 7, an inner surface of a first pack cover 300 facing a pack unit 200 may be spaced apart from a battery cell 211 or a cell group 210, to form a venting path 310 between the first pack cover 300 and the cell group 210.

The first pack cover 300 may also be in contact with a heat propagation blocking member 220 to form a plurality of venting path 310. Each of the venting path 310 may exist on a plurality of cell groups 210.

The venting path 310 may be connected to at least one of a separate external venting path (not illustrated) and a first venting hole (112a in FIG. 1), formed in a pack housing 100.

Figure 8:
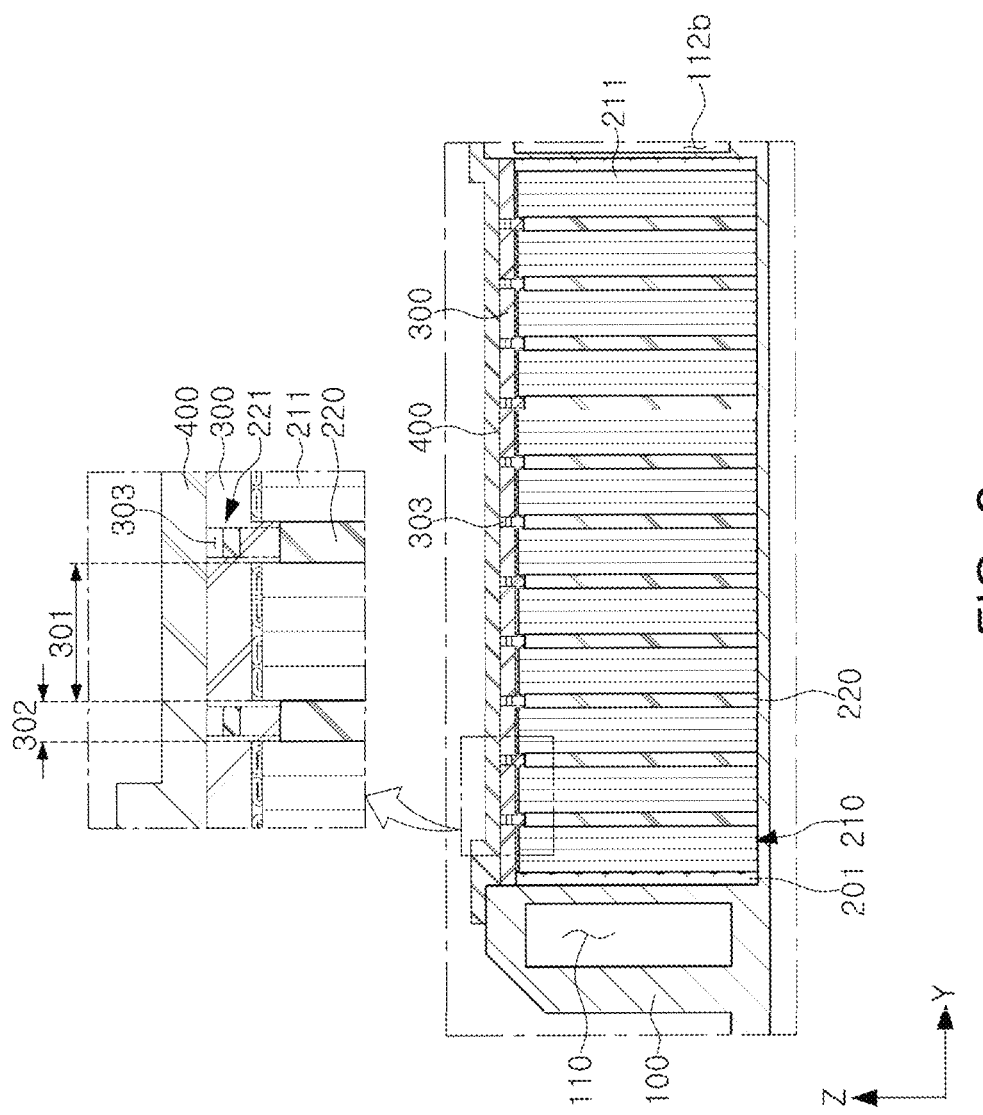
FIG. 8 is a partially enlarged view of a portion corresponding to FIG. 3, according to another embodiment of the present disclosure.

FIG. 8 is a partially enlarged view of a portion corresponding to FIG. 3, according to another embodiment of the present disclosure.

As illustrated in FIG. 8, a heat propagation blocking member 220 may pass through a first pack cover 300, and an end portion 221 of the heat propagation blocking member 220 may exist in a third hollow portion 303.

In an embodiment of the present disclosure, a throughhole (not illustrated) formed on the first pack cover 300 and through which the heat propagation blocking member 220 passes, and an outer periphery of the heat propagation blocking member 220 may be formed to have tolerance in intermediate fitting or loosely fitting.

According to this, it is possible to improve performance for assembling between the heat propagation blocking member 220 and the first pack cover 300, and it is possible to improve performance for coupling between the heat propagation blocking member 220 and the first pack cover 300.

In addition, when a thermal runaway phenomenon, ignition, explosion, or the like occurs in a space in which any one cell group 210 is disposed, breakage of coupling between the first pack cover 300 and the heat propagation blocking member 220 by a pressure thereof may be delayed, minimized, or prevented.

According to the present disclosure, airtightness of a battery pack may be improved, and heat propagation in the battery pack may be delayed or minimized.

In addition, according to the present disclosure, safety of a battery pack may be improved.

While example embodiments have been illustrated and described above, various modifications and variations to the described example embodiments and other embodiments could be made without based on what is disclosed in the present disclosure.

What is claimed is:

1. A battery pack comprising:
a pack housing structured to enclose battery cells;
a partition member coupled to the pack housing and partitioning a space of the pack housing into a plurality of accommodation spaces;
a plurality of pack units respectively disposed in the plurality of accommodation spaces, each pack unit includes one or more battery cells;
a first pack cover covering at least one of the plurality of accommodation spaces or the plurality of pack units;
a second pack cover covering the first pack cover and the pack housing; and
one or more heat propagation blocking members are disposed between the plurality of battery cells,
wherein the first pack cover is in contact with the one or more heat propagation blocking members to isolate the plurality of battery cells from each other in the plurality of pack units, and
a contact region between the one or more heat propagation blocking members and the first pack cover is positioned between the plurality of battery cells.

2. The battery pack of claim 1, wherein the first pack cover includes a planar region facing the battery cells.

3. The battery pack of claim 2, wherein the first pack cover includes a protruding region that is in contact with the one or more heat propagation blocking members and protrudes toward the one or more heat propagation blocking members.

4. The battery pack of claim 1, wherein at least a portion of a region of the first pack cover is arranged to face the battery cells and is in physical contact with the battery cells.

5. The battery pack of claim 1, wherein at least a portion of an inner surface of the first pack cover is arranged to face the battery cells and is spaced apart from the battery cells to form a venting path between the at least portion of the inner surface of the first pack cover and the battery cells.

6. The battery pack of claim 1, wherein the one or more heat propagation blocking members pass through the first pack cover.

7. The battery pack of claim 1, further comprising a bus bar assembly connected to an electrode tab of the battery cells.

8. The battery pack of claim 7, wherein the bus bar assembly comprises:
a bus bar member connected to the electrode tab of the battery cells; and
an insulating member supporting the bus bar member.

9. The battery pack of claim 7, further comprising end plates located on front and rear surfaces of the plurality of pack units and facing the battery cells.

* * * * *